2,996,473
CURING HALOGENATED COPOLYMERS OF ETHYLENE AND AN ALPHA-OLEFIN WITH AN ORGANIC POLYTHIOCARBONATE AND A METAL CONTAINING COMPOUND, AND PRODUCT THEREOF
William P. Cain, Linden, Leon S. Minckler, Jr., Metuchen, and Henry S. Makowski, Carteret, N.J., assignors to Esso Research and Engineering Company, a corporation of Delaware
No Drawing. Filed May 29, 1959, Ser. No. 816,695
12 Claims. (Cl. 260—41)

The present invention relates to the preparation of synthetic rubber and more particularly to halogenated rubbery amorphous copolymers which can be cured to produce synthetic rubber.

The low-pressure polymerization and copolymerization of alpha olefins with catalyst systems made up of a partially reduced heavy transition metal halide and a reducing metal-containing compound to high density, high molecular weight, solid, relatively linear products is now well known, see e.g. Belgian Patent 533,362, "Chemical and Engineering News," April 8, 1957, pages 12 through 16, and "Petroleum Refiner," December 1956, pages 191 through 196.

The preparation of synthetic rubber from chlorinated rubbery amorphous copolymers of ethylene and a higher alpha olefin has been disclosed and claimed in copending application Serial No. 738,940, filed June 2, 1958. A process for the preparation of the corresponding brominated copolymers has been disclosed and claimed in Serial No. 708,370, filed January 13, 1958. These applications describe curing systems for the halogenated copolymers.

It has now been found that halogenated rubbery amorphous copolymers of ethylene and higher alpha olefins can be cured with a curing agent mixture surprisingly superior to those previously disclosed. In particular, it has now been found that superior synthetic rubbers are produced with a curing mixture which contains (1) a curing agent which cures through halogen groups such as metal oxides and (2) an organic polythiocarbonate. It has further been found that the synthetic rubbers of the invention cured with a curing mixture which includes an organic polythiocarbonate surprisingly exhibit dynamic fatigue properties and ozone resistance superior to those cured with curing mixtures containing sulfur.

The organic polythiocarbonates can be either trithiocarbonates or dithiocarbonates. The trithiocarbonates have the following structure:

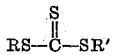

The dithiocarbonates have the structure:

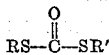

wherein in both formulas, R and R' are the same or different and can be any alkyl, aryl, alkylaryl, arylalkyl or cycloalkyl group, such as methyl, ethyl, isopropyl, phenyl, benzyl, alkylphenyl, phenylmethyl, cyclohexyl, etc. Also R and R' may be connected in a cyclic structure such as in ethylene trithiocarbonate:

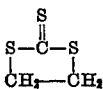

Ethylene trithiocarbonate is preferred for use in the present invention.

The curing agents which cure through halogen groups which are used in combination with the organic polythiocarbonates include metal oxides, metal salts and metal powders. In general, the metal components of the metal salts, metal oxides and metal powders are chosen from groups IIA and IIB of the periodic table and copper, and iron. Particularly useful are the metal oxides, sulfides, nitrates, phosphates, sulfates, and organic acid salts of zinc, cadmium, manganese, iron and lead.

The halogenated copolymers cured by the curing agents of the invention are copolymers having an olefin content of 15 to 85 mol percent ethylene and 85 to 15 mol percent of a higher alpha olefin containing from 3 to 8 carbon atoms such as propylene, butene-1, heptene-1, and the like which contain from 1 to 30 wt. percent, preferably 2 to 15 wt. percent halogen; have a crystallinity of less than 25%, usually less than 10%; have softening points of less than 25° C.; tensile strengths of from 50 to 1000 p.s.i., preferably 50 to 500 p.s.i.; an apparent modulus of elasticity at —50° C. of from 10,000 to 400,000 p.s.i., preferably from 50,000 to 200,000 p.s.i., and more preferably from 60,000 to 150,000 p.s.i.; and intrinsic viscosities in tetralin at 125° C. at a concentration of one gram per liter of from 0.4 to 3.5, preferably 0.9 to 2.5. The halogenated copolymers also contain unsaturation as evidenced by iodine numbers of up to 30, infra-red spectra, and the fact that partial curing can be effected with the use of sulfur as the curing agent.

An advantageous process for preparing the halogenated copolymers of the invention is described in copending application Serial No. 725,513, filed April 1, 1958, by W. P. Cain et al. which is incorporated herein by reference. In particular, chlorinated copolymers can be prepared according to the process of this copending application by polymerizing ethylene and a higher alpha olefin in contact with a low-pressure polymerization catalyst in an inert diluent, preferably inactivating or removing the catalyst, and then treating the reaction mixture with a halogenating agent at a temperature in the range of 40 to 150° C. The resulting halogenated copolymer is then isolated from the halogenation reaction mixture.

The reaction between the halogenated copolymer and the curing agent mixture is carried out by mixing the chlorinated copolymer and the curing agent mixture on a rubber mill, and heating the resulting mixture in a standard rubber press in the range of from 225° F. to 350° F., preferably 280° F. to 315° F. and more preferably about 310° F. until curing is effected. Fillers, antioxidants and oils are added with the curing agent mixture as desired. The mixing is carried out on a rubber mill followed by heating the resulting mixture to reaction temperature in a standard rubber press or other conventional rubber curing equipment. The mixing can also be carried out in other rubber compounding equipment, such as Banbury mixers and kneaders.

The cured halogenated copolymers of the invention have excellent mechanical properties, dynamic properties, and ozone resistance. They are useful wherever a good general purpose elastomer is required, such as in tires, hoses, gaskets and the like. Their use in tires is particularly advantageous since the synthetic rubber of the invention is tough and yet resilient and ozone resistant.

From 0.5 to 15, preferably from 2 to 8 parts of the halogen group curing agent is used per 100 parts of halogenated copolymer and from 0.5 to 10 parts, preferably from 1 to 6 parts of the organic polythiocarbonate of the invention is used per 100 parts of halogenated copolymer.

Fillers such as carbon blacks, silica, mica and others of like nature can be added to the curing mixtures in amounts of from 5 to 150 parts, preferably about 50 parts. Any type of carbon black can be used, such as channel blacks, furnace blacks, acetylene blacks, lamp blacks, and the like.

Accelerators can be used in the curing mixtures but they are unnecessary since the organic polythiocarbonates of the invention give a very rapid cure.

Antioxidants can also be added when desired, such as for example secondary aromatic amines and phenols, e.g., phenyl-beta-naphthylamine, N,N'-di-beta-naphthyl-p-phenylene-diamines, aldol-alpha-naphthylamine, 2,2,4-trimethyl-1,2-dihydroquinoline, hydroquinone monobenzyl ether, and 2,2'-methylene-bis(4-methyl-6-tert. butylphenol). From 0.01 to 10%, preferably 0.1 to 2% of antioxidant can be used.

Oils derived from coal tar, pine tar and/or petroleum can be added to the curing mixture if desired and from 2 to 30 parts, preferably 5 to 15 parts by weight of oil per 100 parts of chlorinated polymer can be employed to serve as inexpensive fillers, softening agents or tackifying agents.

The invention will be understood more clearly from the following examples, which are not meant to limit the invention.

EXAMPLES I–III

A chlorinated ethylene-propylene copolymer which was prepared from a 50–50 ethylene-propylene feed and which had a chlorine content of 8.01% and a Harris molecular weight of 40,600 was cured according to the following three recipes.

*Example I*
RECIPE A

| Component: | Parts |
|---|---|
| Polymer | 100 |
| Semi-reinforcing furnace black | 50 |
| Zinc oxide | 5 |
| Sulfur | 2 |
| Tetramethylthiuram disulfide | 1 |
| Benzothiazyl disulfide | 1 |
| Stearic acid | 1 |

*Example II*
RECIPE B

| Component: | |
|---|---|
| Polymer | 100 |
| Semi-reinforcing furnace black | 50 |
| Zinc oxide | 5 |
| Stearic acid | 1 |
| Ethylene trithiocarbonate | 5 |

*Example III*
RECIPE C

| Component: | |
|---|---|
| Polymer | 100 |
| Semi-reinforcing furnace black | 50 |
| Zinc oxide | 5 |
| Stearic acid | 1 |
| Ethylene trithiocarbonate | 3 |

In Example I the stock was cured for 30 minutes at 311° F. and the stocks in Example II and III were cured for 45 minutes at 311° F. into cylinders 0.7 inch in diameter and 1 inch in height. These were tested in a Goodrich flexometer (ASTM Standards on Rubber Products: D-623 52T). They were tested under a load of 89 p.s.i. and subjected to a compression stroke 0.25 inch in length at a rate of 30 strokes per second. The initial temperature of the pellets was 100° C. in all cases. The results are given in Table I.

TABLE I

| Example | I | II | III |
|---|---|---|---|
| Time of Testing, Min. | 32 | 20 | 30 |
| Percent Permanent Set | 41 | 3.7 | 3.7 |
| Percent Dynamic Drift | 29 | 1.8 | 1.3 |
| Temp. Rise, ° C. | 43 | 22 | 23 |
| Appearance | (1) | (2) | (2) |

[1] Very Porous and flattened.
[2] Excellent.

It can be seen from Table I that the organic polythiocarbonate cures (Example II and III) yield rubbers having vastly improved dynamic fatigue properties compared to the sulfur-zinc oxide cure. The permanent sets of Examples II and III are only 4% as compared to 40% for the sulfur-zinc oxide cure of Example I, and the percent dynamic drifts of Example II and III are only 1.5% as compared to 30% for the sulfur-zinc oxide cure. The temperature rises of the cures of Examples II and III were only about half as great as the temperature rise of the sulfur-zinc oxide cure. Finally, the appearance, at the end of testing, of the rubbers of the invention is excellent whereas the appearance of the sulfur-zinc oxide cure is very poor. The sulfur-zinc oxide cure developed a large amount of porosity during testing whereas no porosity of any kind was noted in the organic polythiocarbonate cures.

The vulcanizates from these 3 examples were also tested for other properties as shown in Table II.

TABLE II

| Example | I | II | III |
|---|---|---|---|
| Tensile Strength, p.s.i. | 1,970 | 2,480 | 2,630 |
| Elongation, percent | 460 | 230 | 250 |
| Absolute Damping, poises c.p.s. | 6.14×10⁶ | 3.57×10⁶ | 3.76×10⁶ |
| Dynamic Modulus, dynes cm.⁻² | 12.9×10⁷ | 14.0×10⁷ | 12.8×10⁷ |
| Relative Damping, percent | 31.9 | 18.5 | 21.1 |

These data show the excellent dynamic and mechanical properties of the cures of the invention.

EXAMPLE IV

The following example shows the marked improvement in ozone resistance of the organic polythiocarbonate cures over that of the sulfur-zinc oxide cure. Chlorinated ethylene-propylene copolymer (prepared from a 50–50 ethylene-propylene feed, percent Cl=5.9, Harris molecular weight=66,000) was cured according to the following two recipes.

RECIPE C

| Component: | Parts |
|---|---|
| Polymer | 100 |
| Semi-reinforcing furnace black | X |
| Zinc oxide | 5 |
| Sulfur | 2 |
| Tetramethylthiuram disulfide | 1 |
| Benzothiazyl disulfide | 1 |
| Stearic acid | 1 |

RECIPE D

| Component: | |
|---|---|
| Polymer | 100 |
| Semi-reinforcing furnace black | X |
| Zinc oxide | 5 |
| Ethylene trithiocarbonate | 5 | where X is either 0, 25, 50, 75 or 100 parts of semi-reinforcing furnace black. All stocks were cured for 15', 30', and 45' at 308° F. The vulcanizates were then tested for ozone resistance. Microdumbbells were stretched to 50% extension and exposed to 0.2% ozone. The times for the samples to crack and then to break were noted. The results are shown in the following Table III.

TABLE III

| Recipe | Semi-Reinforcing Carbon black, phr. | Cure at 308° F. Min. | Time to Crack, Minutes | Time to Break, Minutes | Original Properties | | Final Properties [1] | |
|---|---|---|---|---|---|---|---|---|
| | | | | | Tensile Strength, p.s.i. | Elongation, Percent | Tensile Strength, p.s.i. | Elongation, Percent |
| C | 0 | 15 | 56 | 61 | | | | |
| | | 30 | 115 | 130 | | | | |
| | | 45 | <3 | 5 | | | | |
| C | 25 | 15 | 32 | 40 | | | | |
| | | 30 | 88 | 92 | | | | |
| | | 45 | 105 | 111 | | | | |
| C | 50 | 15 | 6 | 9 | | | | |
| | | 30 | 13 | 16 | | | | |
| | | 45 | <3 | 6 | | | | |
| C | 75 | 15 | 5 | 7 | | | | |
| | | 30 | 7 | 10 | | | | |
| | | 45 | 5 | 8 | | | | |
| C | 100 | 15 | 5 | 7 | | | | |
| | | 30 | | 5 | | | | |
| | | 45 | <4 | 6 | | | | |
| D | 0 | 15 | | >370 | 590 | 310 | 470 | 280 |
| | | 30 | | >360 | | | | |
| | | 45 | | >370 | 520 | 260 | 870 | 320 |
| D | 25 | 15 | | >370 | 2,510 | 520 | 1,930 | 440 |
| | | 30 | 325 | >360 | | | | |
| | | 45 | | >370 | 2,360 | 440 | 1,900 | 350 |
| D | 50 | 15 | | >370 | 2,750 | 320 | 1,640 | 240 |
| | | 30 | 280 | >360 | | | | |
| | | 45 | | >370 | 2,800 | 300 | 1,490 | 200 |
| D | 75 | 15 | 12 | 45 | | | | |
| | | 30 | 88 | 115 | | | | |
| | | 45 | 200 | 220 | | | | |
| D | 100 | 15 | 60 | 75 | | | | |
| | | 30 | | 76 | | | | |
| | | 45 | 80 | 110 | | | | |

[1] Measured on those specimens which were not cracked nor broken during the ozone test.

It can be seen from the above table that with all curing conditions the ozone resistance of the organic polythiocarbonate cures (Recipe D) were vastly superior to those using sulfur-zinc oxide (Recipe C). Particular attention is directed to the organic polythiocarbonate cures employing from 0 to 50 parts of carbon black. The retention of mechanical properties for these cures after a six hour exposure to ozone was between 50 and 80 percent, which is outstanding.

Additionally, the resilience of the synthetic rubbers of Table III were determined at temperatures ranging from —75° C. to 100° C., and it was found that the resilience of all samples of the organic polythiocarbonate cures, which ranged from 51–59% at room temperature, were equivalent to or better than the resilience of the corresponding sulfur-zinc oxide cured rubbers.

Modifications of the above invention can be made by those skilled in the art without departing from the scope and spirit of the invention.

What is claimed is:

1. A cured halogenated copolymer having an olefin content of 15 to 85 mol percent ethylene and 85 to 15 mol percent of an alpha olefin containing from 3 to 8 carbon atoms and a halogen content of from 1 to 30 wt. percent and characterized in having before curing (a) a crystallinity of less than 25%; (b) a softening point of less than 25° C.; (c) a tensile strength of from 50 to 1000 p.s.i.; (d) an apparent modulus of elasticity at —50° C. of from 10,000 to 400,000 p.s.i., and (e) an intrinsic viscosity in tetralin at 125° C. at a concentration of one gram per liter of 0.4 to 3.5; said curing being effected with a curing mixture comprising (a) an organic polythiocarbonate selected from the group consisting of (1) a trithiocarbonate having the formula

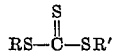

(2) a dithiocarbonate having the formula

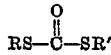

wherein in both formulas R and R' are alkyl, aryl, alkylaryl, arylalkyl and cycloalkyl groups, and (3) an alkylene polythiocarbonate and (b) a metal containing substance selected from the group consisting of metal oxides, metal salts and metal powders, the metal components of which are chosen from groups IIA and IIB of the periodic table, copper and iron.

2. A composition of matter of claim 1 wherein said polythiocarbonate is ethylene trithiocarbonate.

3. The composition of matter of claim 1 wherein said alpha olefin containing from 3 to 8 carbon atoms is propylene.

4. The composition of matter of claim 1 wherein said halogenated copolymer is a chlorinated copolymer.

5. The composition of matter of claim 1 wherein said halogenated copolymer is a brominated copolymer.

6. The process for forming a synthetic rubber comprising the steps of mixing a halogenated copolymer having an olefin content of 15–85 mol percent ethylene and 85–15 mol percent of an alpha olefin containing from 3 to 8 carbon atoms and a halogen content of 1–30 wt. percent, and a curing agent composition comprising (a) an organic polythiocarbonate selected from the group consisting of (1) a trithiocarbonate having the formula

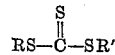

(2) a dithiocarbonate having the formula

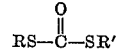

wherein in both formulas R and R' are alkyl, aryl, alkylaryl, arylalkyl and cycloalkyl groups, and (3) an alkylene polythiocarbonate, and (b) a metal containing substance selected from the group consisting of metal oxides, metal salts, and metal powders, the metal components of which are chosen from groups IIA and IIB of the periodic table and copper and iron; and heating the resulting mixture to curing temperatures to cure said halogenated copolymer.

7. The process of claim 6 wherein the alpha olefin containing from 3 to 8 carbon atoms is propylene.

8. The process of claim 6 wherein the halogenated copolymer contains from 2–15 wt. percent halogen.

9. The process of claim 6 wherein the halogenated copolymer is selected from the group consisting of chlorinated and brominated copolymers.

10. The process of claim 6 wherein the curing agent mixture contains from 5 to 150 parts of inert filler.

11. The process of claim 6 wherein the curing agent mixture comprising from 0.5 to 10 parts of organic polythiocarbonate and from 0.5 to 15 parts of said metal-containing substance per 100 parts of halogenated copolymer.

12. The process of claim 6 wherein a curing temperature in the range of 225–350° F. is used.

References Cited in the file of this patent

UNITED STATES PATENTS

| | | |
|---|---|---|
| 2,850,490 | Canterino et al. | Sept. 2, 1958 |
| 2,858,292 | Swart et al. | Oct. 28, 1958 |